US009652614B2

(12) United States Patent
Hulten et al.

(10) Patent No.: US 9,652,614 B2
(45) Date of Patent: *May 16, 2017

(54) APPLICATION REPUTATION SERVICE (71) Applicant: Microsoft Corporation, Redmond, WA (US)

(72) Inventors: Geoff Hulten, Lynnwood, WA (US); Paul Steve Rehfuss, Bellevue, WA (US); Ron Franczyk, Redmond, WA (US); Christopher A. Meek, Kirkland, WA (US); John Scarrow, Sammamish, WA (US); Andrew Newman, Franklin Lake, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,051

(22) Filed: Jun. 12, 2014

(65) Prior Publication Data

US 2014/0298465 A1    Oct. 2, 2014

Related U.S. Application Data (63) Continuation of application No. 12/103,713, filed on Apr. 16, 2008, now Pat. No. 8,769,702.

(51) Int. Cl.
*G06F 21/56* (2013.01)
*G06F 21/51* (2013.01)
(Continued)

(52) U.S. Cl.
CPC .............. *G06F 21/56* (2013.01); *G06F 21/51* (2013.01); *G06F 17/3053* (2013.01);
(Continued)

(58) Field of Classification Search
CPC ..... H04L 63/20; G06F 2221/033; G06F 21/56; G06F 17/3053; G06F 21/44
See application file for complete search history.

(56) References Cited

U.S. PATENT DOCUMENTS 5,864,620 A    1/1999   Pettitt
5,974,549 A    10/1999  Golan
(Continued)

FOREIGN PATENT DOCUMENTS

CN    1423766 A       6/2003
JP    2002-197035 A   7/2002
(Continued)

OTHER PUBLICATIONS

Damiani, et al., "A Reputation Based Approach for Choosing Reliable Resources in Peer to Peer Networks", Conference on Computer and Communications Security, Proceedings of the 9th ACM conference on Computer and communications security, US, Year of Publication: 2002, pp. 207-216.

(Continued)

*Primary Examiner* — Carl Colin
*Assistant Examiner* — Gary Lavelle
(74) *Attorney, Agent, or Firm* — L. Alan Collins; Collins & Collins Intellectual, LLC (57) ABSTRACT Technologies for an application reputation service to assist users with minimizing their computerized machines' exposure to and infection from malware, including an application reputation service that contains the reputations for elements (e.g., applications) that are known to be non-malicious as well as those known to be malicious. In one example, when a user attempts to install or execute a new application, the service is queried by the user's machine with a set of identities for the element. The service determines the reputation of the application by referencing a knowledge base of (Continued)

known reputations and returns an indication (e.g., an overall rating, or a flag) of how safe that application would be to install and run on the user's computer.

15 Claims, 6 Drawing Sheets

(51) Int. Cl.
  *H04L 29/06* (2006.01)
  *G06F 21/44* (2013.01)
  *G06F 17/30* (2006.01)

(52) U.S. Cl.
  CPC ........ *G06F 21/44* (2013.01); *G06F 2221/033* (2013.01); *H04L 63/20* (2013.01)

(56) References Cited

U.S. PATENT DOCUMENTS

| | | | |
|---|---|---|---|
| 5,995,625 | A | 11/1999 | Sudia |
| 6,092,194 | A | 7/2000 | Touboul |
| 6,792,544 | B2 | 9/2004 | Hashem |
| 6,804,780 | B1 | 10/2004 | Touboul |
| 6,934,857 | B1 | 8/2005 | Bartleson |
| 6,986,042 | B2 | 1/2006 | Griffin |
| 7,103,529 | B2 | 9/2006 | Zimmer |
| 7,290,282 | B1 | 10/2007 | Renert |
| 7,343,624 | B1 | 3/2008 | Rihn |
| 7,668,951 | B2 | 2/2010 | Lund |
| 7,761,912 | B2 | 7/2010 | Yee |
| 8,312,537 | B1* | 11/2012 | Nachenberg .......... H04L 63/145 705/64 |
| 2002/0095589 | A1 | 7/2002 | Keech |
| 2002/0161637 | A1 | 10/2002 | Sugaya |
| 2002/0172367 | A1 | 11/2002 | Mulder |
| 2003/0212913 | A1 | 11/2003 | Vella |
| 2004/0064736 | A1 | 4/2004 | Obrecht et al. |
| 2004/0073810 | A1 | 4/2004 | Dettinger |
| 2005/0198181 | A1 | 9/2005 | Ritter |
| 2005/0283837 | A1 | 12/2005 | Olivier et al. |
| 2006/0021029 | A1 | 1/2006 | Brickell et al. |
| 2006/0026123 | A1* | 2/2006 | Moore ................. G06F 9/5055 |
| 2006/0053202 | A1 | 3/2006 | Foo |
| 2006/0095404 | A1 | 5/2006 | Adelman |
| 2006/0161988 | A1 | 7/2006 | Costea |
| 2006/0168024 | A1 | 7/2006 | Mehr |
| 2006/0212270 | A1 | 9/2006 | Shiu |
| 2006/0212925 | A1 | 9/2006 | Shull et al. |
| 2006/0212931 | A1 | 9/2006 | Shull |
| 2006/0253581 | A1 | 11/2006 | Dixon |
| 2006/0253583 | A1 | 11/2006 | Dixon et al. |
| 2006/0253584 | A1 | 11/2006 | Dixon |
| 2006/0277259 | A1 | 12/2006 | Murphy |
| 2007/0005716 | A1 | 1/2007 | LeVasseur |
| 2007/0016953 | A1* | 1/2007 | Morris ................. G06F 21/56 726/24 |
| 2007/0027992 | A1* | 2/2007 | Judge ................. G06Q 10/107 709/227 |
| 2007/0050444 | A1 | 3/2007 | Costea |
| 2007/0113282 | A1 | 5/2007 | Ross |
| 2007/0118669 | A1 | 5/2007 | Rand |
| 2007/0130350 | A1* | 6/2007 | Alperovitch ........ H04L 63/1425 709/229 |
| 2007/0130351 | A1 | 6/2007 | Alperovitch |
| 2007/0136808 | A1 | 6/2007 | Xiong |
| 2007/0143407 | A1 | 6/2007 | Avritch |
| 2007/0180078 | A1 | 8/2007 | Murphy |
| 2007/0192855 | A1 | 8/2007 | Hulten et al. |
| 2007/0208940 | A1 | 9/2007 | Adelman et al. |
| 2007/0245417 | A1 | 10/2007 | Lee |
| 2007/0250644 | A1 | 10/2007 | Lund et al. |
| 2007/0255702 | A1 | 11/2007 | Orme |
| 2008/0005223 | A1 | 1/2008 | Flake |
| 2008/0109870 | A1* | 5/2008 | Sherlock ............. H04L 63/1425 726/1 |
| 2008/0125094 | A1 | 5/2008 | Heurtaux |
| 2008/0168135 | A1* | 7/2008 | Redlich ................. G06Q 10/10 709/204 |
| 2008/0209031 | A1 | 8/2008 | Zhu |
| 2008/0288278 | A1 | 11/2008 | Buss |
| 2009/0204542 | A1 | 8/2009 | Doman |
| 2009/0249335 | A1 | 10/2009 | Vasilevsky |
| 2009/0271428 | A1 | 10/2009 | Adelman |
| 2009/0282476 | A1 | 11/2009 | Nachenberg et al. |
| 2009/0328209 | A1 | 12/2009 | Nachenberg |
| 2010/0005291 | A1 | 1/2010 | Hulten |
| 2010/0042942 | A1 | 2/2010 | Vasilevsky |
| 2010/0274815 | A1* | 10/2010 | Vanasco ............ G06F 17/30867 707/798 |
| 2011/0067101 | A1 | 3/2011 | Seshadri |
| 2011/0154018 | A1 | 6/2011 | Edstrom |
| 2011/0197159 | A1 | 8/2011 | Chaganti |
| 2011/0219448 | A1 | 9/2011 | Sreedharan |
| 2011/0271346 | A1 | 11/2011 | Spurlock et al. |

FOREIGN PATENT DOCUMENTS

| | | |
|---|---|---|
| JP | 2004-118692 A | 4/2004 |
| JP | 2004-355372 A | 12/2004 |
| JP | 2007-295162 A | 11/2007 |
| WO | 98/43152 A1 | 10/1998 |
| WO | 2007035327 A2 | 3/2007 |
| WO | 2009/094086 A2 | 7/2009 |
| WO | 2010/002638 A2 | 1/2010 |

OTHER PUBLICATIONS

Boldt, et al., "Preventing Privacy-Invasive Software using Collaborative Reputation Systems", Secure Data Management 2007, pp. 142-157.

Herzberg, "Protecting Web Users from Phishing, Spoofing and Malware",Cryptology ePrint Archive, Report 2006/083, Dated: Feb. 26, 2006, pp. 1-15.

U.S. Appl. No. 12/103,713, filed Apr. 16, 2008, Hulten.

U.S. Appl. No. 12/037,936, filed Feb. 27, 2008, Hulten.

U.S. Appl. No. 13/412,299, filed Mar. 5, 2012, Hulten.

U.S. Appl. No. 14/589,433, filed Jan. 5, 2015, Hulten.

U.S. Appl. No. 13/010,189, filed Jan. 20, 2011, Oliver.

European Patent Office, EP Communication for Application No. 09714849.8, pp. 1-5, Jul. 6, 2011, Germany.

Korean Intellectual Property Office, Officer Hyun-Woong Sohn, PCT International Search Report and Written Opinion for Application No. PCT/US2009/032005, pp. 1-9, Apr. 22, 2009, Korea.

Zou, "Feedback Email Worm Defense System for Enterprise Networks", Umass ECE Technical Report TR-04-CSE-05, 8 pages, Apr. 2004.

Balzer, "Assuring the Safety of Opening Email Attachments", In Proceedings of the DARPA Information Survivability Conference and Exposition II (DISCEX '01), 6 pages, Jun. 12-14, 2001.

"Trend Micro™: Email Reputation Services: Getting Started Guide", 54 pages, Nov. 2007.

Apgar, "Secure data transmission methods", SearchSecurity.com, 4 pages, Jan. 17, 2006.

"Automatic protection against malware, prevention of unauthorized applications", AppSense®: Application Manager Desktop Edition, 2 pages, 2005.

Chinese Patent Office, Author unknown, CN Notice on the First Office Action for Application No. 200980106986.8, pp. 1-3, Jul. 23, 2012, China.

Chinese Patent Office, Author unknown, CN Notice on the Second Office Action for Application No. 200980106986.8, pp. 1-3, Feb. 5, 2013, China.

Chinese Patent Office, Author unknown, CN Notice on the Third Office Action for Application No. 200980106986.8, pp. 1-3, May 17, 2013, China.

Chinese Patent Office, Author unknown, CN Notice on the Fourth Office Action for Application No. 200980106986.8, pp. 1-4, Oct. 12, 2013, China.

(56) References Cited

OTHER PUBLICATIONS

Chinese Patent Office, Author unknown, CN Decision on Rejection for Application No. 200980106986.8, pp. 1-2, Apr. 23, 2014, China.
Chinese Patent Office, Author unknown, CN Decision on Reexamination for Application No. 200980106986.8, p. 1, Oct. 8, 2014, China.
Chinese Patent Office, Author unknown, CN Notice on Grant of Patent Right for Invention for Application No. 200980106986.8, pp. 1-2, Oct. 31, 2014, China.
European Patent Office, EP Communication under Rule 71(3) EPC: Intention to grant for Application No. 09714849.8, pp. 1-7, May 7, 2012, Germany.
Japanese Patent Office, JP Notification of reason for rejection for Application No. 2010-548767, pp. 1-7, Feb. 17, 2012, Japan.
Japanese Patent Office, JP Notification of reason for rejection for Application No. 2010-548767, pp. 1-2, Jun. 1, 2012, Japan.
Chinese Patent Office, CN First Office Action for Application No. 201210018544.1, pp. 1-5, Apr. 2, 2014, China.
"Symantec Delivers Groundbreaking Reputation-based Security Technology", Press Release, 4 pages, Sep. 9, 2009.
Cai, "Three-Dimensional Based Trust Management Scheme for Virus Control in P2P Networks", In proceedings of the IEEE International Conference on Communications (ICC'2010), 5 pages, May 23-27, 2010, Cape Town, South Africa.
Josang, "A Survey of Trust and Reputation Systems for Online Service Provision", Published in Decision Support Systems, ScienceDirect, vol. 43, Issue 2, 43 pages, Mar. 2007.
"Cisco IronPort S-Series Web Security Appliances", 9 pages, Originally retrieved on Aug. 9, 2010.
Viralm, "New Feature for Norton Internet Security 2010—Download Insight", Norton Protection Blog, Norton Community, 19 pages, Jul. 2, 2009.
"Web of Trust for Firefox", 7 pages, Nov. 24, 2009.
Cai, "A Reliable Study of Software Reputation Based on User Experience", Master Thesis, Computer Science, Thesis No. MSC-2009:19, School of Computing, Blekinge Institute of Technology, 63 pages, Published on May 20, 2010, Sweden.
"Phishing Filter and Resulting Internet Communication in Windows Vista", Microsoft TechNet, 5 pages, Retrieved Date: Sep. 21, 2010.
"McAfee Web Gateway", McAfee, Inc., 4 pages, Copyright ® 2010.
Maximilien, "Reputation and Endorsement for Web Services", ACM SlGecom Exchanges—Chains of Commitment, vol. 3, Issue 1, 8 pages, Winter 2002.
Chinese Patent Office, CN Second Office Action for Application No. 201210018544.1, pp. 1-4, Dec. 5, 2014, China.
Chinese Patent Office, CN Third Office Action for Application No. 201210018544.1, pp. 1-3, Mar. 23, 2015, China.
Chinese Patent Office, Author unknown, CN Notification to Grant Patent Right for Invention for Application No. 201210018544.1, pp. 1-2, Jul. 1, 2015, China.

* cited by examiner

APPLICATION REPUTATION SERVICE

RELATED APPLICATIONS

This Application is a Continuation of and claims benefit from U.S. patent application Ser. No. 12/103,713 that was filed Apr. 16, 2008, which is incorporated herein by reference in its entirety.

BACKGROUND

The emergence of the Internet as a network of distributed computers and computerized devices has made a significant contribution towards the advancement of modern society, resulting in a profound impact to nearly every aspect of modern living. The unprecedented speed, versatility and capacity available through the communication and dissemination of information over the Internet have revolutionized the business and practice of numerous industries, and enabled the rise of entirely new fields of commerce.

Unfortunately, those very features provided by the Internet have also provided the impetus for the development of new breeds of malicious and/or immoral behavior. Identity theft and fraud over the Internet have increased in alarming rates with unmistakable correlation to the growth and popularity of Internet usage. Other undesirable activities facilitated by the Internet include the transfer of electronic "SPAM" (unsolicited or undesired bulk electronic messages) and computer malware.

Malware is software designed to infiltrate or damage a computerized system without the consent of the owner. The expression has generally grown to encompass a variety of hostile, intrusive or annoying software or program code, including but not limited to computer viruses, worms, trojan horses, spyware and adware.

Malware has been documented since at least 1986, and recent estimates have speculated that the number of malware variants has reached at least half a million as of 2007. An estimated 31.7% of all computer systems are believed to be infected by at least one form of malware, accounting for tens of billions of dollars of direct damages to individuals as well as organizations. The number of new Malware variants is believed to be increasing at a rate of several hundred per day.

Malware constitutes a serious threat to individuals and organizations worldwide. Accordingly, numerous products and services have been developed to eliminate or mitigate the effect of malicious code on a computer system. Traditional methods of combating malware include writing digital signatures for confirmed malicious code, and updating the signature files in participating computer systems. Computer systems are then able to identify incoming data as malicious code if the digital signatures of the incoming data correspond to the signatures of known malware in the signature file.

The introduction of new variants of malware at the current rate of hundreds each day already require constant updates to the signature files to even maintain any level of effective mitigation, at an obvious cost to efficiency. Furthermore, this method is effective only insofar as all replications of the malicious code use the same digital signature. Unfortunately, malware writers commonly employ schemes to personalize each replication of the malware, thereby rendering the signature detection method ineffective.

Typically, when incoming malware is detected by a computer application, the application will stop the process that is allowing the malware access to the computer system and provide notice to the user of the potentially infected system that the current action includes the risk of introducing malware to the system. Commonly, the notice to the user is provided as a warning and may include information about the malware (e.g., the specific risks of the particular variant, the areas of the computer system that may be contaminated, and the source of the malware, etc). The user can choose to proceed with the action, thereby accepting the risk of acquiring the malware, or choose to cancel the action.

Regrettably, the information (if any) contained in the warning is often incomplete, obtuse, cryptic, irrelevant, or otherwise incomprehensible to the user. Improperly warned users may not understand the severity of the warning and insist on proceeding with their originally intended course of action. Other users may simply be desensitized by the sheer frequency of warnings (due in part to the user's own high-risk activity, perceived irrelevancy of the warnings and the proliferation of malware) and knowingly ignore the risk of infection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The claimed subject matter is directed to the use of an application reputation service to assist users with minimizing their computerized machines' exposure to and infection from malware. Specifically, the claimed subject matter provides a method and system of an application reputation service that contains the reputations for elements that are known to be non-malicious as well as those known to be malicious.

One embodiment of the claimed subject matter is implemented as a method to determine the reputation of an element (e.g., an application). When a user attempts to install or execute a new application, the Application Reputation Service is queried by the user's machine with a set of identities for the element. The Application Reputation Service determines the reputation of the application by referencing a knowledge base of known reputations and returns an indication (e.g., an overall rating, or a flag) of how safe that application would be to install and run on the user's computer.

The set of identities may include the hash of the element, the signature used to digitally sign the element (where available), the domain on which the application was hosted, the URL from which the application was downloaded, or the public key used in conjunction with a signature to verify the application's certificate. In cases where a plurality of identities is available for a single application, an internal hierarchy may be used to rank the identities and return to the user's machine the most relevant reputation, or the reputations may be combined in some fashion, e.g. by a decision tree.

Another embodiment of the claimed subject matter is implemented as a method to mitigate the risk to a user of a computer system from malware infection. When a user attempts to install or execute an application locally or over the Internet, the process is halted, and the reputation of the application is determined and communicated to the user if the reputation of the application is known to be malicious, or if the reputation is still relatively unknown. A warning will be provided to the user concerning the reputation and/or risk of continuing to execute the application. Additional information based on the various reputations may be presented to the user to assist in their decision. Depending on the application, subsequent user access to the application may be limited, or additional protection may be provided, e.g. by raising security levels and executing the application in a protected environment (sandbox or virtual machine). When the reputation of the application is known to be non-malicious, the reputation of the application is not presented to the user, and the user is allowed to continue to install or execute the application as desired.

In another embodiment, the claimed subject matter is implemented as a system that stores the reputations of elements and returns reputation queries from external, authorized applications. This embodiment includes one or more databases which store the reputations corresponding to the identities of the elements as well as information for the internal management of establishing and validating permissions for the external application. This embodiment also includes one or more interfaces used to communicate with the external application and the user.

BRIEF DESCRIPTION

DETAILED DESCRIPTION

Reference will now be made in detail to the preferred embodiments of the claimed subject matter, a method and system for the use of a reputation service provider, examples of which are illustrated in the accompanying drawings. While the claimed subject matter will be described in conjunction with the preferred embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and system for the use of a reputation service provider. The claimed subject matter provides a reputation service provider that is queried when a user attempts to execute or install an application. The reputation service provider is queried with information regarding the application of the application, whereby the reputation service provider references a knowledge base of application reputations and returns to the user and indication of the reputation corresponding to the application. Embodiments of the claimed subject matter and its benefits are further described below.

Figure 1:
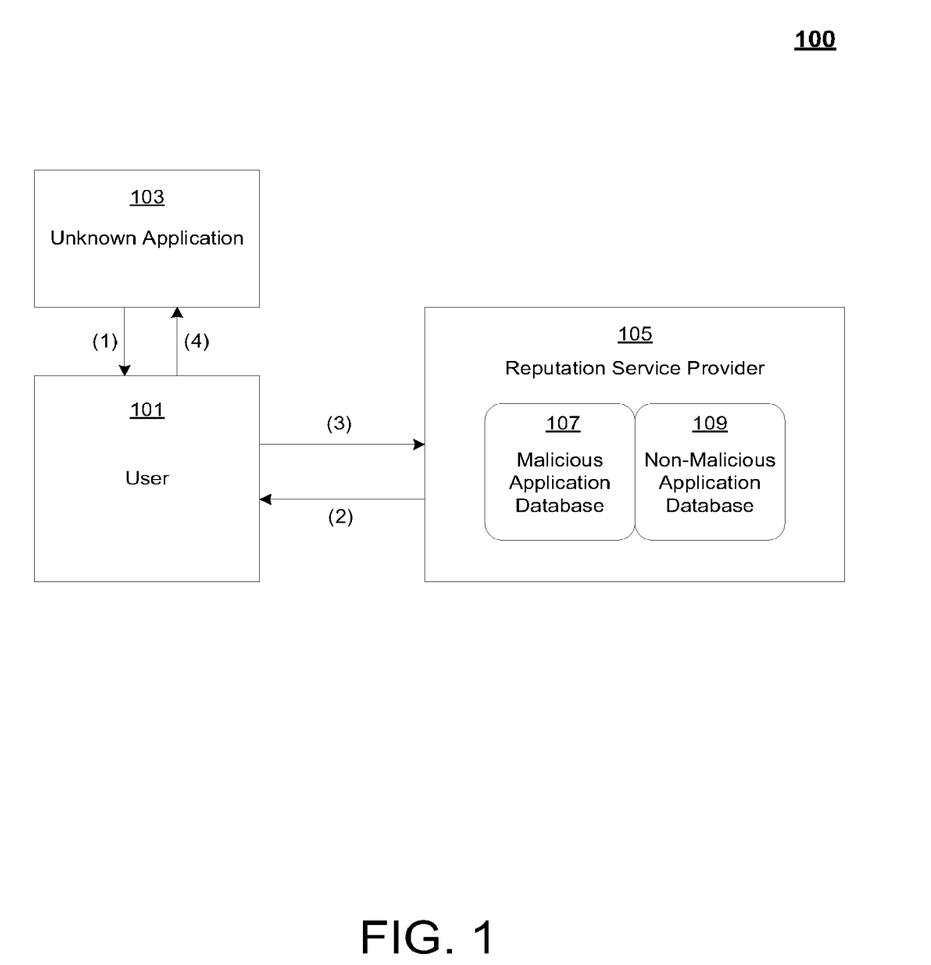
FIG. 1 is a diagram describing a system for mitigating the risk to a user of a computer system from malware infection communicated via an application attempting the performance of an operation.

FIG. 1 is a diagram describing a system 100 for mitigating the risk to a user of a computer system from malware infection communicated via an application attempting the performance of an operation, in accordance with the various embodiments herein described.

According to the system 100 of FIG. 1, an unverified application 103 attempts to install or execute itself on the computing system of a user 101 at time (1). An unverified application 103 includes applications whose reputations have yet to be determined by the Reputation Service Provider 105 for the computer system of the user 101. The user 101 may be attempting to access the functionality of the unverified application 103 locally, or via a remote computing device such as a desktop or laptop computing system. The unverified application may, for example, be a remote application hosted on an online website or an unverified application pre-stored (i.e., downloaded in memory, or available via a readable medium.) on the computing system of the user 101.

According to the system 100, the system of the user 101 obtains information associated with the identity of the unverified application 103. According to one embodiment, the Reputation Service Provider 105 is a server application that communicates with a client application executing on the system of the user 101 that monitors and delays the installation and/or execution of unverified applications until the reputation of the unverified application has been determined to be non-malicious. In one aspect, the client application running on the system of the user 101 is a web service API with functionality to obtain the information associated with the identity of the unverified application 103.

In another aspect, the client application includes a reputation search API that communicates with the remote server or locally-running implementation of the Reputation Service Provider 105. In another aspect, the Reputation Service Provider 105 receives a direct web service inquiry without the implementation of a reputation search API. In yet another aspect, the Reputation Service Provider 105 stores the data used to verify the reputations of the identities and affiliating applications in the cache of the system of the user 101.

The information associated with the identity of the unverified application 103 typically comprises a set of relatively limited "identities" that can be used to identify certain characteristics of the unverified application (e.g., the source of the unverified application, the publisher of the unverified application, the unverified application itself). This information may include, for example, the hash of the unverified application, the signature contained in the certificate of a signed unverified application, or the public key contained in the certificate and used to sign the application. Other identifying information can be acquired by the system of the user 101 independently of the unverified application 103. For instance, the domain on which the unverified application was hosted (i.e., the domain name of the transferring address or party, if the unverified application is transferred through email) or the URL (web address) from which the unverified application was downloaded can provide information that the system of the user 101 can glean to identify the unverified application and/or its source.

Some or all of the information obtained regarding the identity (including the source) of the unverified application is sent as a set of identities to a Reputation Service Provider 105 at time (2). The Reputation Service Provider 105 is a system that includes one or more updated knowledge bases containing the identification information (e.g., identities) of applications with current, established reputations. Updating the knowledge bases may be performed at predetermined times, or automatically upon the introduction/recognition of a new malicious or non-malicious application.

According to the system 100 of FIG. 1, the Reputation Service Provider 105 includes a knowledge base implemented as a Malicious Application Database 107 containing the identification information for confirmed malicious applications, and a knowledge base implemented as a Non-Malicious Application Database 109 containing the identification information for confirmed non-malicious applications.

The Reputation Service Provider 105 receives the identification information from the system of the user 101 and references the knowledge base(s) containing the established reputations for known identities (and by extension the applications corresponding to the known identities). If the unverified application 103 is associated with identification information that corresponds with identification information of confirmed malicious applications or non-malicious applications, the system of the user 101 is sent an indication of the relative reputation of the unverified application 103 at time (3), after which the reputation of the application 103 becomes verified (either confirmed malicious or confirmed non-malicious).

If, on the other hand, an unverified application 103 is associated with one or more identities that have conflicting reputations, the reputation of the most relevant application is selected and sent to the system of the user 101. Relevance may be determined by valuing the degree that a particular identity specifies the affiliating application. For example, a hash of the application may be one of the most specific forms of identification, whereas the domain or URL where the application was hosted and/or obtained may be (for large file hosting services) ambiguous, or at least uncertain.

In another embodiment, if an unverified application 103 is associated with one or more identities that have conflicting reputations, the reputations for the set of identities may be combined to determine the aggregate reputation of the identities in a policy-driven method, such as a decision tree. The reputation of the application is thus determined from the decision tree (or other such method) of the combined reputations of the identities associated with the application In the event an unverified application 103 is associated with identification information that is completely unknown to the knowledge base, or where there is inadequate reputation information to conclude an application is malicious or non-malicious, the Reputation Service Provider 105 will also send an indication of the uncertainty of the reputation of the unverified application. In some embodiments, the Reputation Service Provider 105 will present whatever reputation information is available to the user to assist in their choice. For example, if only the domain reputation of an unverified application 103 is known, the Reputation Service Provider 105 may warn the user that the reputation of the specific application is unknown or unconfirmed, but also present the reputation of the domain hosting the application to the user.

According to the indication from the Reputation Service Provider 105 received by the system of the user 101, the system of the user 101 can choose to block, limit or allow the execution or installation of the application 103 to continue. For example, if the reputation of the application 103 is determined to be malicious, the system of the user 101 may choose to terminate the installation or discontinue execution of the application 103. Conversely, a non-malicious reputation may prompt the system of the user 101 to allow installation or execution to continue unimpeded.

Figure 2:
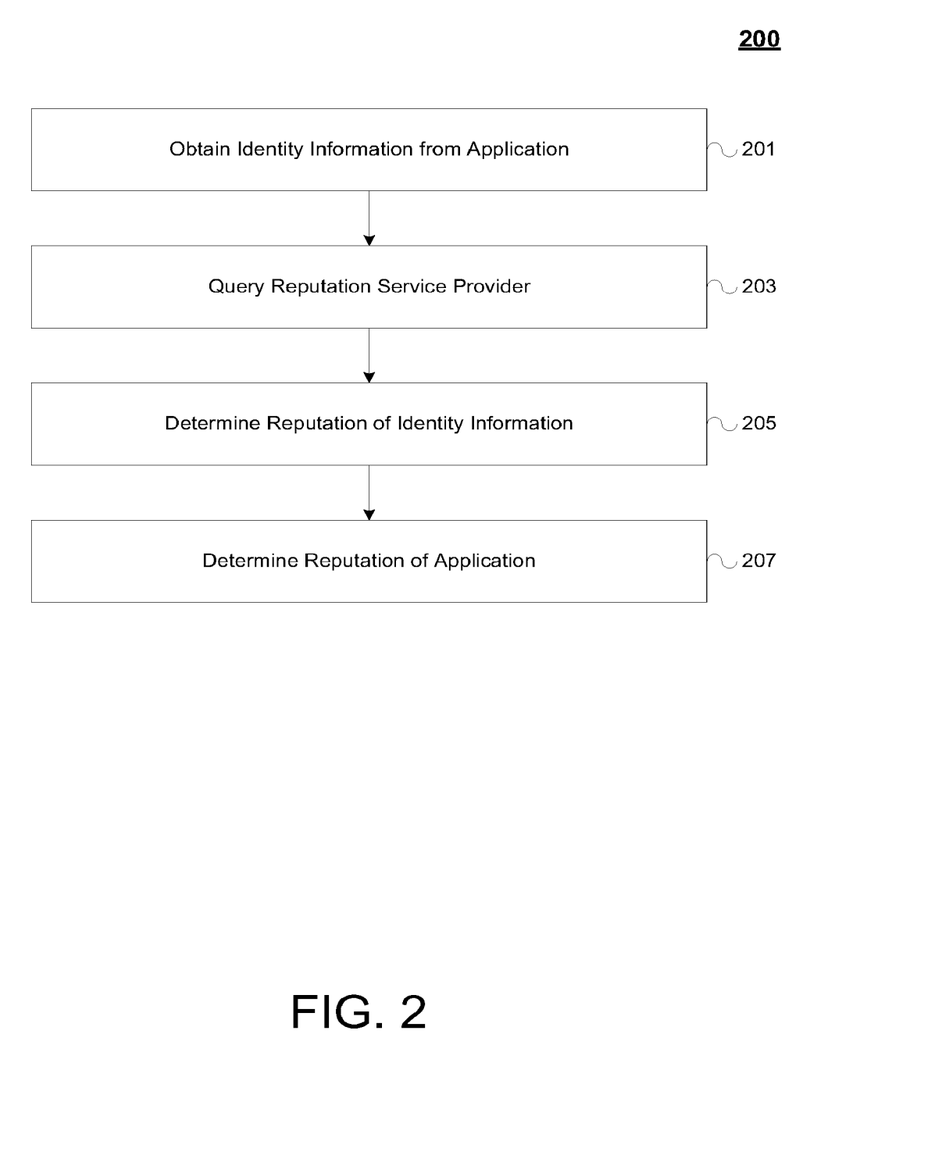
FIG. 2 is a flowchart describing the process for determining the reputation of an unverified application in accordance with various embodiments of the claimed subject matter.

FIG. 2 is a flowchart describing the process 200 for determining the reputation of an unverified application in accordance with various embodiments of the claimed subject matter. Steps 201-207 describe exemplary steps comprising the process 200 in accordance with the various embodiments herein described.

According to the process 200 of FIG. 2, identity information associated with an unverified application that is attempting to execute or install itself onto a user's computer system is obtained by the user's computer system at step 201. The information may be obtained by client software from the Reputation Service Provider running on the system of the user 101. The software may for example, be implemented as a client application monitoring the installation and execution of new applications in the system of the user 101, a client application that includes functionality to glean the identity information from the unverified application. Other embodiments include a local implementation of the Reputation Service Provider 105 with a reputation knowledge base stored in the cache of the system of the user 101; an implementation of the Reputation Service Provider 105 as a web service accessible through direct inquiry or an API.

This identity information may include, for example, the hash of the new application, the certificate used to digitally sign the application, the key incorporated in the certificate, the domain on which the application was hosted (i.e., the domain name of the transferring address or party, if the application is transferred through email) or the URL (web address) from which the application was downloaded.

At step 203, the Reputation Service Provider 105 is queried with the set of identities derived at step 201. In one aspect, the set of identities is aggregated before the set is delivered. In another aspect, the set of identities can be delivered according to a queue, or even randomly. As mentioned previously, the exchange of the data comprising the set of identities may be performed through an interface such as an API or direct query request which communicate the data remotely (i.e., over the Internet, through a local network). The exchange of data comprising the set of identities may also be performed locally, with reference to a locally stored cache or a local implementation of the Reputation Service Provider 105 in the memory of the system of the user 101. Additional security protocols may include encrypting the data prior to the transmittal of the data.

According to some embodiments, the set of information is deciphered (if encrypted) and the reputation for the set of identities is determined at step 205. The reputation for the set of identities may be determined by ranking the identities by relevance, and using the reputation of the highest ranking identity. In one aspect, the relevance is determined as a function of the specificity of the identification. For example, a hash of the application is specific to the application (or even the version of the application), whereas a publisher may have the same certificate for a plurality of applications and a domain may host a multitude of applications from more than one publisher. Alternatively, the reputation for the set of identities may also be determined by combining the identities and determining the aggregate reputation in a policy-driven method, such as a decision tree.

At step 207, the reputation of the theretofore unverified application 103 is determined by referencing the set of identities for the application 103 with a knowledge base of established application reputations. In one embodiment, the knowledge base is a database with an aggregated storage of identities, affiliate applications to the identities, and corresponding reputations for the identities and affiliating applications. According to another embodiment, the knowledge base comprises the conjunction of a plurality of databases, with the range of reputation distinguished and distributed among them (i.e., identities with confirmed malicious reputations are stored in one database, identities with established non-malicious reputations are stored separately from the confirmed malicious reputations).

The reputation of the unverified application 103 is determined by referencing the knowledge base with the set of identities (or the ranked set of identities in embodiments where the set of identities were previously ranked) received in step 203 (and ranked in step 205, where applicable). If an identity within the set of received identities matches one or more identities with confirmed or established reputations in the knowledge base the reputation for the received identity (and by extension the affiliating application) is set to the reputation of the matching identity with a confirmed or established reputation for the purposes of the system of the user 101.

If the application is associated with one or more identities that have conflicting reputations, the reputation of the most relevant identity, where applicable, and as determined in step 205, is selected and set as the reputation of the application 103. Where the ranked set of identities is not available, the Reputation Service Provider 105 may independently determine the most relevant reputation, for example, by averaging the reputations of all the identities affiliated with the unverified application. In another embodiment, the reputations may be combined into a decision tree, whereby the reputation of the application, as an aggregate of the reputations of the identities, may be inferred.

In the event the unverified application 103 is associated with identification information that is completely unknown to the knowledge base, or relatively new enough that the application's reputation has not been conclusively established as either malicious or non-malicious, the Reputation Service Provider 105 will set the reputation of the unverified application to indicate the uncertainty.

Figure 3:
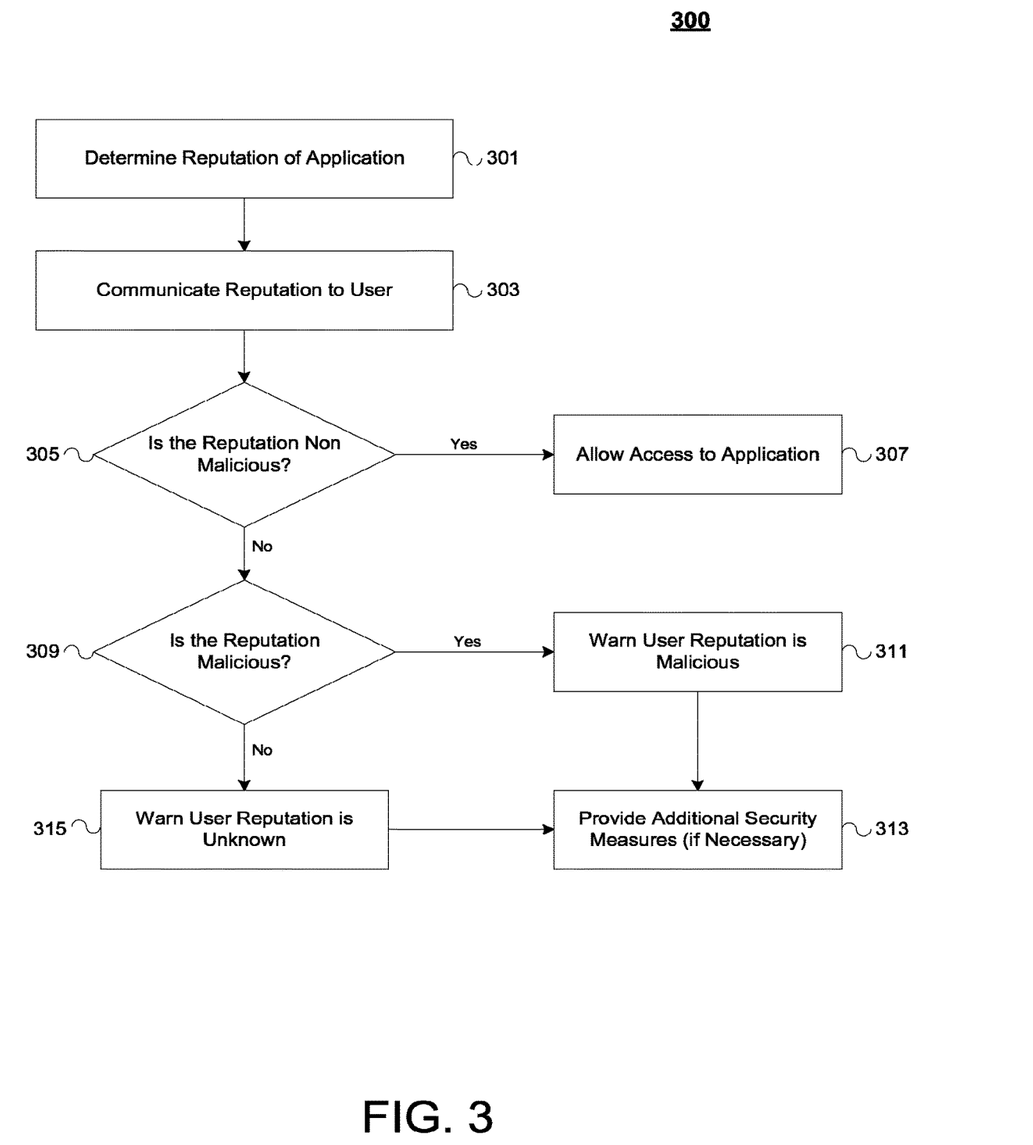
FIG. 3 is a flowchart describing the process for mitigating the risk to a user of a computer system from malware infection communicated via an attempted operation, in accordance with various embodiments of the claimed subject matter.

FIG. 3 is a flowchart describing the process 300 for mitigating the risk to a user of a computer system from malware infection communicated via an attempted operation, in accordance with various embodiments of the claimed subject matter. Steps 301-313 describe exemplary steps comprising the process 300 in accordance with the various embodiments herein described.

At step 301, the reputation of the application attempting an operation (e.g., install or execute) is determined. The reputation of the application is determined according to the foregoing steps 201-207, as detailed herein. As such, further repetition is omitted.

At step 303, upon the determination of the reputation of the application according to step 301, the Reputation Service Provider 105 communicates to the system of the user 101 an indication of the reputation of the application that was set in step 301. The indication of the reputation of the application may be represented according to a variety of means; such as a numerical rating of the overall estimated safety or risk that the application is malware. For example, an application with a confirmed malicious reputation will have a rating representing a high level of risk. Conversely, if the application was determined to have an established non-malicious reputation, the rating will represent a relatively low level of risk of malware infection.

In some embodiments, the reputation indication may include a flag indicating if the application is known or unknown to the Reputation Service Provider 105. Knowledge of the application may also represent the certainty of the determined reputation, as a numerical value. For instance, well known applications will have a higher degree of certainty, whereas new or relatively unknown application will have a low degree of certainty. The certainty of a reputation may also be factored in with the overall rating to reflect the safety or risk of the application At step 305, determination of whether the indicated reputation of the application is likely to be non-malicious occurs. If application is likely non-malicious, the application is allowed to perform the intended operation at step 307.

If, according to step 305, the reputation of the application indicates the application is likely to be not non-malicious (i.e., the reputation is either malicious or unknown), a further determination is made to determine whether the indicated reputation of the application is likely to be malicious at step 309. If the reputation of the application indicates the application is likely to be malicious, the user of the system 101 is warned that the application 103 is malicious at step 311.

In some embodiments, the warning to the user of the system 101 that the application 103 is malicious may include detailed information about the application. The detailed information about the application can include information such as the specific risk to the user, the source of the malicious application, and further precautionary measures the user may take to safeguard against the application in the future. According to another embodiment, the user is provided with the ability to decide whether to continue with the intended operation or to discontinue the operation immediately. A further embodiment removes the application from the system of the user 101 upon discontinuation.

In one embodiment, if the application is determined to be particularly malicious, or otherwise notable (e.g., known to facilitate identity theft, or for crippling computer systems), enhanced security measures may be proactively applied at step 313. Enhanced security measures may include prohibiting the user's machine from enabling the continued operation, or the system may, at the possible cost of reduced performance or convenience, execute the application within a protected environment, such as a sandbox or a virtual machine. According to this embodiment, the application is removed from the system 101 after the user is warned at step 311.

If, according to step 309, the reputation of the application provides no indication whether the application is malicious or non-malicious (i.e., the application is unknown to, or has no established reputation with the Reputation Service Provider 105), the user of the system 101 is provided a warning at step 315. The warning may include information regarding the extent of the reputation of the application, currently known to the Reputation Service Provider, but caution the user of the system 101 of the relative uncertainty of using applications with unknown reputations. In one embodiment, the user is provided with the ability to decide whether to continue with the intended operation or to discontinue the operation immediately. In another embodiment, the system may execute the application within a sandbox or virtual machine once the user has granted permission to continue with the intended operation.

Similarly, where the reputation of an application is relatively uncertain but a particularly malicious or otherwise notable reputation is suspected by the Reputation Service Provider 105, enhanced security measures may be proactively applied at step 313. Enhanced security measures may include prohibiting the user's machine from enabling the continued operation, or (at the user's election) continue to execute the application within a protected environment, such as a sandbox, a virtual machine. The application may also be removed from the system 101 after the user is warned at step 315. In another embodiment, the application is stored until the reputation can be conclusively determined, whereupon the user may choose to continue with the intended operation (if the reputation is subsequently determined to be non-malicious), or the application is removed from the system 101 (if the reputation is subsequently determined to be malicious).

Figure 4:
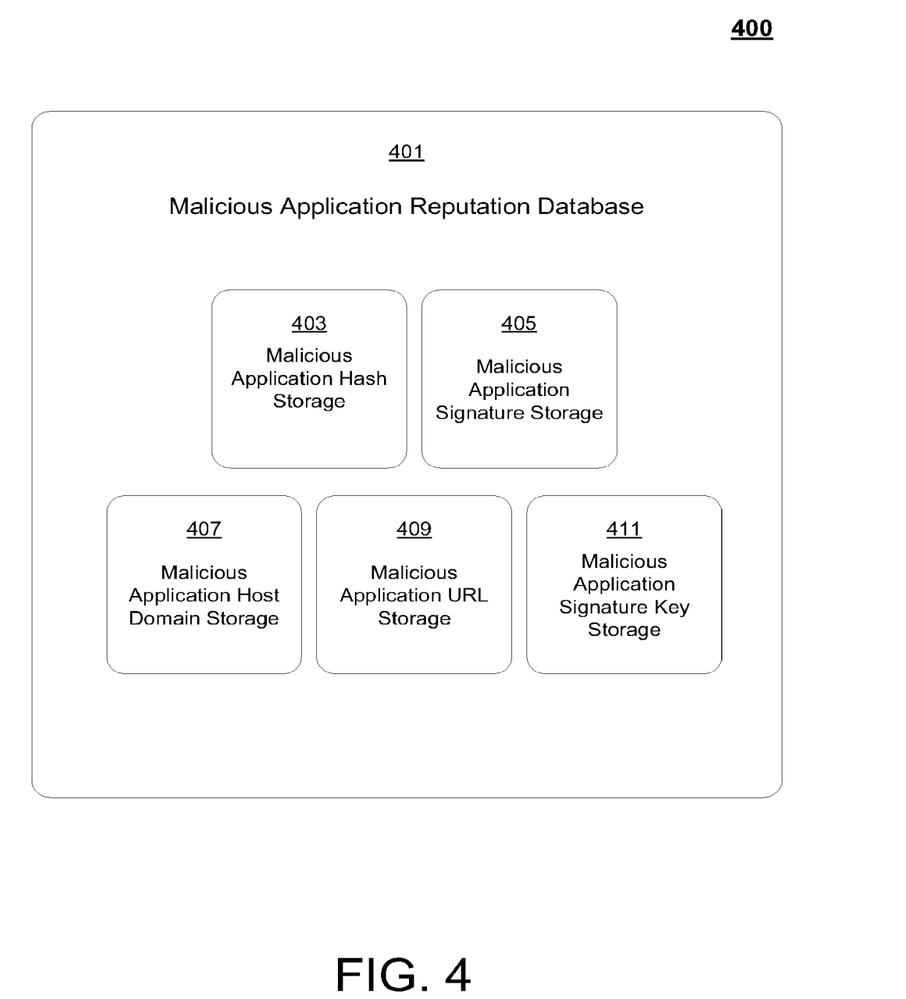
FIG. 4 is a diagram displaying a knowledge base for the storage of identity information of applications with confirmed malicious reputations, in accordance with the various embodiments herein described.

FIG. 4 is a diagram displaying a knowledge base 400 for the storage of identity information of applications with confirmed malicious reputations, in accordance with the various embodiments herein described.

The knowledge base 400 comprises a Malicious Application Reputation Database 401. The Malicious Application Reputation Database 401 is provided with components for the storage of application identities. According to FIG. 4, the Malicious Application Reputation Database 401 includes a component for the storage of program hashes 403, a component for the storage of digital signatures 405, a component for the storage of application hosting domains 407, a component for the storage of URLs from which an application is downloaded 409, and a component for the storage of the key used to sign a digital certificate 411.

The component 403 for the storage of program hashes stores the program hashes for applications known to be malicious. The component for the storage of digital signatures 405 stores the digital signatures used by applications known to be malicious in conjunction with a public key to verify the certificate of the application. The component for the storage of application hosting domains 407 stores the domains confirmed to host malicious applications. The component for the storage of URLs from which an application is downloaded 409 stores the URLs from which a malicious application is downloaded. The component for the storage of the key used to sign a digital certificate 411 stores the public keys released by the publisher of a confirmed malicious application that can be used in conjunction with a digital signature to certify the certificate of the application.

In one embodiment, each storage component is a separate database stored within or accessible to the Malicious Application Reputation Database 401. In another embodiment, the Malicious Application Reputation Database 401 stores the identities directly, and includes the components for characterizing and distinguishing the identities.

Figure 5:
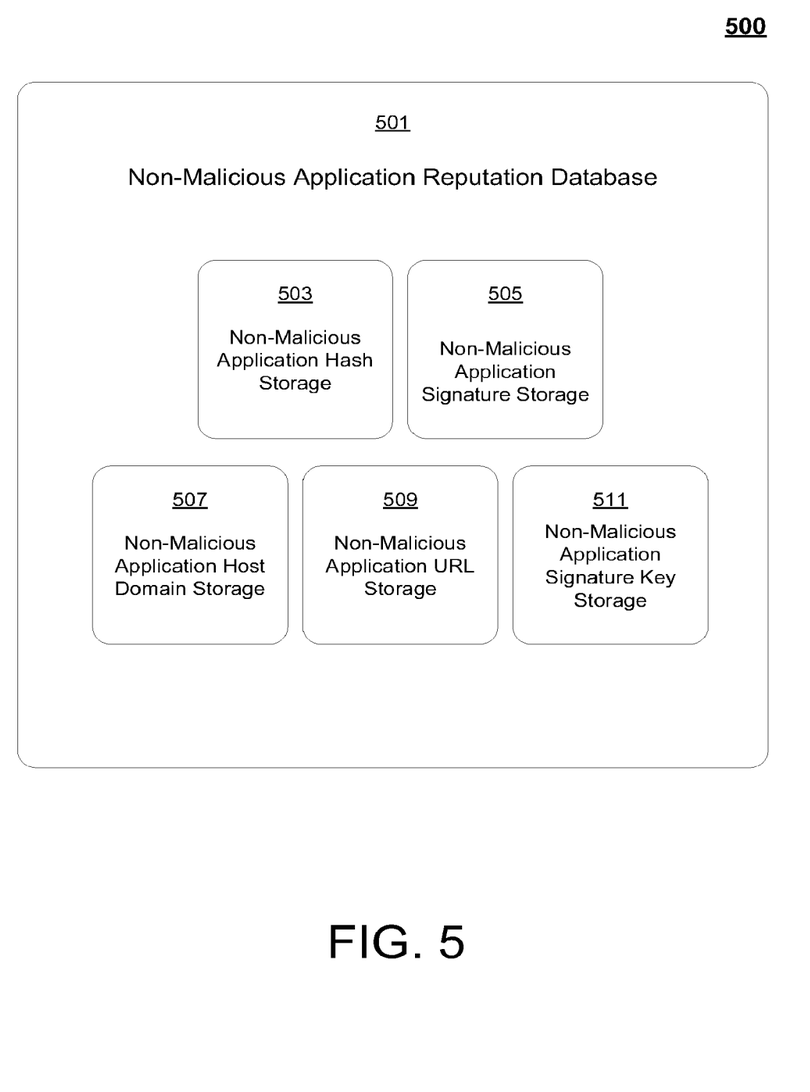
FIG. 5 is a diagram displaying a knowledge base for the storage of identity information of applications with established non-malicious reputations, in accordance with the various embodiments herein described.

FIG. 5 is a diagram displaying a knowledge base 500 for the storage of identity information of applications with established non-malicious reputations, in accordance with the various embodiments herein described.

The knowledge base 500 comprises a. Non-Malicious Application Reputation Database 501. The Non-Malicious Application Reputation Database 501 is provided with components for the storage of application identities. According to FIG. 5, the Non-Malicious Application Reputation Database 501 includes a component for the storage of program hashes 503, a component for the storage of digital signatures 505, a component for the storage of application hosting domains 507, a component for the storage of URLs from which an application is downloaded 509, and a component for the storage of the key used to sign a digital certificate 511.

The component 503 for the storage of program hashes stores the program hashes for applications with established non-malicious reputations. The component for the storage of digital signatures 505 stores the digital signatures used by applications with established non-malicious reputations in conjunction with a public key to verify the certificate of the application. The component for the storage of application hosting domains 507 stores the domains confirmed to host applications with established non-malicious reputations. In one embodiment, the component for the storage of application hosting domains 507 stores the domains confirmed to host applications with established non-malicious reputations only.

The component for the storage of URLs where applications can be downloaded from 509 stores the URLs from which one or more non-malicious applications are downloaded. In one embodiment, the component for the storage of URLs where applications may be downloaded from 509 stores the URLs from which only non-malicious applications are downloaded. According to this embodiment, a URL from which a malicious application is downloaded may not be stored in the component for the storage of URLs from which a non-malicious application is downloaded 509. The component for the storage of the key used to sign a digital certificate 511 stores the public keys released by the publisher of an application with established non-malicious reputations that can be used in conjunction with a digital signature to certify the certificate of the application.

In one embodiment, each storage component is a separate database stored within or accessible to the Non-Malicious Application Reputation Database 501. In another embodiment, the Non-Malicious Application Reputation Database 501 stores the identities directly, and includes the components for characterizing and distinguishing the identities.

Figure 6:
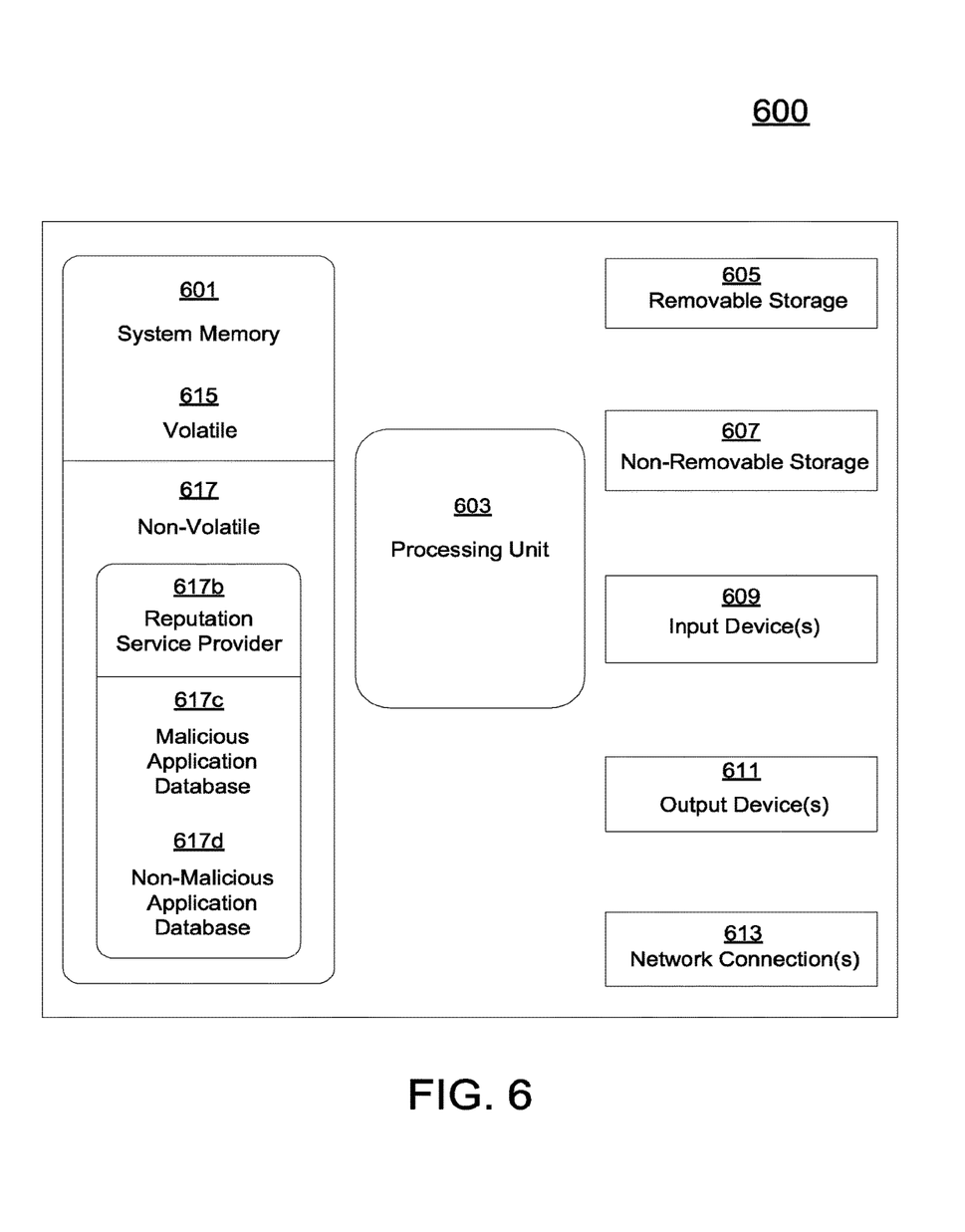
FIG. 6 shows an exemplary computing device according to various embodiments.

FIG. 6 shows an exemplary computing device 600 according to various embodiments. Computing device 600 depicts the components of a basic computer system providing the execution platform for certain software-based functionality in accordance with various embodiments. Computing device 600 can be an environment upon which the Reputation Service Provider 105 from various embodiments is instantiated. In addition, computer device 600 can be the system of the user 101, or an environment upon which the application 103 attempting to perform an operation is implemented, as a website, for example. Computing device 600 can include, for example, a desktop computer system, laptop computer system or server computer system. Similarly, computing device 600 can be implemented as a handheld device (e.g., cell-phone, etc.) Computing device 600 typically includes at least some form of computer readable media. Computer readable media can be a number of different types of available media that can be accessed by computing device 600 and can include, but is not limited to, computer storage media.

In one embodiment, the system of the user 101 is implemented through the use of software as a virtual machine, and the application performs the intended operation entirely on the instantiated virtual machine, thereby avoiding the risk of infection to the actual system of the user 101. According to this embodiment, the virtual machine may be implemented as software by the processing unit 603.

In its most basic configuration, computing device 600 typically includes processing unit 603 and memory 601. Depending on the exact configuration and type of computing device 600 that is used, memory 601 can be volatile (such as RAM) 615, non-volatile 617 (such as ROM, flash memory, etc.) or some combination thereof. In one embodiment, a Reputation Service Provider 617*b* is instantiated in the non-volatile memory 617. The Reputation Service Provider 617*b* may include an Malicious Application Database 617*c*, which includes the identity information for some or all of a set of applications known and confirmed to be malicious and/or have malicious reputations by the Reputation Service Provider 617*b*. The Reputation Service Provider 617*b* may also include a Non-Malicious Application Database 617*d*, comprising the identity information for some or all of a set of applications known with established non-malicious reputations by the Reputation Service Provider 617*b*.

According to one embodiment, the Reputation Service Provider 105 is located on a separate computing device 600 from the system of the user 101, which may also comprise a computing device 600. In another embodiment, the Reputation Service Provider 105 is implemented in the System Memory of the computing device 600 comprising the system of the user 101. In some embodiments, the Reputation Service Provider 617*b* may be fully or partially implemented in the volatile memory 615 of a computing device 600 that is the system of the user 101. In one embodiment, the Reputation Service provider 617*b* may store a knowledge base in the cache of the system of the user 101.

Additionally, computing device 600 can include mass storage systems (removable 605 and/or non-removable 607) such as magnetic or optical disks or tape. The application attempting to perform an operation on the system of the user 101 may be locally stored on a mass storage system. The computing device 600 can include input devices 609 and/or output devices 611 (e.g., such as a display). In addition, computing device 600 can include network connections 613 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed on at least one computing device, the method comprising:
   receiving, by the computing device from a second computing device over a network, a set of identities that corresponds to an unverified application attempting to install or execute itself on the second computing device, where each identity in the set corresponds to the unverified application with a corresponding degree of specificity;
   ranking, by the computing device, the identities in the received set by relevance, where the relevance of each identity is a function of its corresponding degree of specificity;
   matching, by the computing device, each of at least some of the ranked identities in the set to any corresponding reputation in a knowledge base of established application reputations;
   determining, by the computing device based on the ranked identities and the matching any corresponding reputations, a reputation of the unverified application based on the any corresponding reputations; and
   communicating, by the computing device to the second computing device over the network, the determined reputation of the unverified application.

2. The method of claim 1 further comprising providing the determined reputation to the second computing device.

3. The method of claim 1 further comprising resolving, in response to any conflicts among the any corresponding reputations, the any conflicts based on an identity with a highest of the rankings of the identities.

4. The method of claim 1 where the determining is further based on an average or an aggregate of the corresponding reputations.

5. The method of claim 1 where the determined reputation indicates a level of risk and a degree of certainty for the level of risk.

6. A system comprising at least one computing device and software that are together configured for performing actions comprising:
   receiving, by the computing device from a second computing device over a network, a set of identities that corresponds to an unverified application attempting to install or execute itself on the second computing device, where each identity in the set corresponds to the unverified application with a corresponding degree of specificity;

ranking, by the computing device, the identities in the received set by relevance, where the relevance of each identity is a function of its corresponding degree of specificity;

matching, by the computing device, each of at least some of the ranked identities in the set to any corresponding reputation in a knowledge base of established application reputations;

determining, by the computing device based on the ranked identities and the matching any corresponding reputations, a reputation of the unverified application based on the any corresponding reputations; and communicating, by the computing device to the second computing device over the network, the determined reputation of the unverified application.

7. The system of claim 6, the actions further comprising providing the determined reputation to the second computing device.

8. The system of claim 6, the actions further comprising resolving, in response to any conflicts among the any corresponding reputations, the any conflicts based on an identity with a highest of the rankings of the identities.

9. The system of claim 6 where the determining is further based on an average or an aggregate of the corresponding reputations.

10. The system of claim 6 where the determined reputation indicates a level of risk and a degree of certainty for the level of risk.

11. At least one computer memory comprising instructions that, when executed by at least one computing device, cause the at least one computing device to perform actions comprising:

receiving, by the computing device from a second computing device over a network, a set of identities that corresponds to an unverified application attempting to install or execute itself on the second computing device, where each identity in the set corresponds to the unverified application with a corresponding degree of specificity;

ranking, by the computing device, the identities in the received set by relevance, where the relevance of each identity is a function of its corresponding degree of specificity;

matching, by the computing device, each of at least some of the ranked identities in the set to any corresponding reputation in a knowledge base of established application reputations;

determining, by the computing device based on the ranked identities and the matching any corresponding reputations, a reputation of the unverified application based on the any corresponding reputations; and communicating, by the computing device to the second computing device over the network, the determined reputation of the unverified application.

12. The at least one computer memory of claim 11, the actions further comprising providing the determined reputation to the second computing device.

13. The at least one computer memory of claim 11 where the determined reputation indicates a level of risk and a degree of certainty for the level of risk.

14. The at least one computer memory of claim 11, the actions further comprising resolving, in response to any conflicts among the any corresponding reputations, the any conflicts based on an identity with a highest of the rankings of the identities.

15. The at least one computer memory of claim 11 where the determining is further based on an average or an aggregate of the corresponding reputations.

\* \* \* \* \*